US009536387B2

(12) United States Patent
Doyle et al.

(10) Patent No.: US 9,536,387 B2
(45) Date of Patent: Jan. 3, 2017

(54) GAMING MACHINE SYSTEMS AND METHODS FOR ACCEPTING VARIOUS CURRENCIES

(75) Inventors: Thomas P. Doyle, Reno, NV (US); Ronald C. Gallaway, Reno, NV (US)

(73) Assignees: SHFL ENTERTAINMENT, INC., Las Vegas, NV (US); ARCADE PLANET, INC., Las Vegas, NV (US); BALLY GAMING, INC., Las Vegas, NV (US); BALLY GAMING INTERNATIONAL, INC., Las Vegas, NV (US); BALLY TECHNOLOGIES, INC., Las Vegas, NV (US); SIERRA DESIGN GROUP, Las Vegas, NV (US)

( * ) Notice: Subject to any disclaimer, the term of this patent is extended or adjusted under 35 U.S.C. 154(b) by 962 days.

(21) Appl. No.: 13/078,921

(22) Filed: Apr. 1, 2011

(65) Prior Publication Data

US 2012/0252556 A1 Oct. 4, 2012

(51) Int. Cl.
*A63F 13/00* (2014.01)
*G07F 17/32* (2006.01)

(52) U.S. Cl.
CPC .................................. *G07F 17/3246* (2013.01)

(58) Field of Classification Search
CPC ... G07F 17/32; G07F 17/3204; G07F 17/3246
USPC ........................................................... 463/25
See application file for complete search history.

(56) References Cited

U.S. PATENT DOCUMENTS

| | | | | |
|---|---|---|---|---|
| 2003/0013531 | A1* | 1/2003 | Rowe et al. | 463/42 |
| 2004/0147309 | A1* | 7/2004 | Chamberlain et al. | 463/25 |
| 2005/0197191 | A1* | 9/2005 | McKinley et al. | 463/43 |
| 2009/0054149 | A1* | 2/2009 | Brosnan et al. | 463/42 |

* cited by examiner

*Primary Examiner* — Omkar Deodhar
*Assistant Examiner* — Eric M Thomas
(74) *Attorney, Agent, or Firm* — Philip Anderson; Marvin Hein

(57) ABSTRACT

A system including a bill or note validator of a gaming machine, a host computer, and a game credit meter. The bill or note validator is adapted to receive and recognize at least a first currency and a second currency, each issued by a different jurisdiction, and is further adapted to encode a monetary denomination of the second currency. The host computer is adapted to receive the encoded monetary denomination of the secondary currency, to decode the encoded monetary denomination and to determine an amount of game credit to be credited to the player. The game credit meter is adapted to store a total amount of game credit purchased by the player of the gaming machine including game credit purchased by the player in response to the player inserting one or more bills or notes of either or both currencies into the gaming machine.

11 Claims, 6 Drawing Sheets

GAMING MACHINE SYSTEMS AND METHODS FOR ACCEPTING VARIOUS CURRENCIES

BACKGROUND

Example embodiments pertain to gaming machine systems and processes, and, more particularly, to gaming machine systems and methods for enabling players to deposit one or more types of paper currency to wager and for monitoring associated gaming machine activity and for providing related gaming machine accounting data.

Traditionally, slot machines and other types of conventional gambling machines accepted and dispensed only coins. For these machines, the game monitoring and accounting are straightforward. Coin input by a player always becomes part of game activity, i.e., the player risks all of the coins he or she inserts into the machine. Therefore, game activity is monitored simply by tracking coin inflows and outflows for the machine. In addition, the change in the level of coins in a coin payout hopper, which is impractical to measure directly, can be inferred quite easily by subtracting the sum of the total game outflow and the total number of coins diverted to the game's drop bucket from the total number of coins inserted into the machine. Similarly, the calculation of game win percentage is given by the ratio of coin outflow to coin inflow.

Today, the increased sophistication of gaming machine technology has greatly increased player options. For example, gaming machines have been devised which can accept wagers in forms other than coins. For example, a gaming machine that is equipped with a bill acceptor or "validator" for accepting paper currency is described in U.S. Pat. No. 5,113,990. Additionally, gaming machine technology has advanced to such a stage that it is now possible for gaming machines to accept items of monetary value in forms other than cash. As examples, cashless gaming machines available today include machines that accept bar coded coupons and video lottery machines that offer many games, often of various types, within a single cabinet and which pay winnings in the form of printed vouchers issued by the machine.

Most gambling casinos and other gaming locations contain a large number of gaming machines which typically accept as wagers one or more denominations of a paper currency issued by a given jurisdiction, such as U.S. dollars, and dispense winnings in the form of a printed voucher or, alternatively, from a coin payout hopper. Because there is an inflow of paper currency into such machines, it is important to check the authenticity of the currency and keep careful and accurate records of the value of any currency used to purchase credits for wagering, the wagers placed at the machine based on those credits, and game activity such as the total payout. Moreover, gambling regulatory commissions in many jurisdictions require casino operators to maintain very specific accounting data with regard to their gaming machines.

The new forms of wagering and payout instruments have complicated the machine accounting problem. For example, it is now possible for a player to insert U.S. dollar bills, for example, into a gaming machine and cash out immediately without placing any wager. In this case, the game credit purchased and cashed in by the player never becomes part of game activity. Consequently, because not all credits dispensed by the gaming machine are the result of game winnings, monitoring game activity is no longer a simple matter of tracing coin outflows and coin inflows which applied to coin slot machines in the past. Accordingly, the calculation of game win percentage must take into account "vended credits," i.e., credits purchased but not risked.

The failure to account for vended credits means that game-win percentage calculations can be compromised when, for example, a bill acceptor is added to a coin gaming machine. In many such retrofit installations, when the gaming machine accepts paper currency in addition to coins from a player, a meter which counts coin inflows is incremented. Similarly, when the player cashes out, a meter which counts coin outflows is incremented. However, because the player can now collect the credits purchased without risking any of the credits in a wager, the coin outflow meter does not reflect actual game activity. Therefore, the traditional calculation of game win percentage based on the ratio of coin outflow to coin inflow is improperly inflated.

To further complicate the accounting problem, rules established by many gaming regulatory commissions require that all casinos and gaming locations account separately for all of the different forms of monetary value that can be accepted by modern gaming machines. Specifically, most regulatory commissions require a complete audit of all wagers found in the coin and paper currency cash boxes. In machines equipped with coupon readers, the paper currency box may contain bar coded coupons of varying amounts in addition to cash. Yet the gaming establishment's accounting system must provide an audit trail for each of these wagering instruments. In addition, the rules require a separate accounting of the different forms of machine payouts. For example, where machine payouts are in the form of printed vouchers, the vouchers are redeemed and stored at the redemption locations. Because the vouchers are susceptible to being forged or duplicated, the accounting system must also provide a record of these vouchers against which payment may be made. Accounting system methodologies such as those described in U.S. Pat. No. 5,470,079 provide a relatively convenient and unified mechanism for auditing wagering activity in all of these different forms.

However, the problem is exacerbated by the fact that global tourism has resulted in players from different jurisdictions having different types of paper currency frequenting casinos and gaming locations around the world. It would be convenient to enable such players to wager using the currency which is possessed by them without exchanging that currency for the currency of the jurisdiction in which the casino or gaming location is located and also to permit them to wager the type of currency with which they are familiar and thus make them more comfortable with the amount being wagered.

Therefore, there is a need for a more fully generalized game currency acceptance and monitoring and accounting system that maintains audit trails of gaming activity independent of the type of gaming machine and the forms of monetary value accommodated by the gaming machine and keeps accurate game accounting data. More specifically, there is a need for a game currency acceptance and monitoring and accounting system that can accept paper currencies issued by various jurisdictions and can accurately calculate the payout and game win percentage based on accounting data for all varieties of gaming machines which accept such currencies issued by various jurisdictions.

SUMMARY

A gaming machine currency acceptance system and method, set forth by way of example and not limitation, can accept different types of paper currencies. By way of further non-limiting example, a gaming machine system and method that can accept different types of paper currencies can also provide a monitoring and accounting system and method that overcome certain limitations of the prior art.

In an example embodiment, a gaming machine currency acceptance, monitoring, and accounting system and method accepts and validates different types of paper currencies and record gaming activity regardless of the form of currency used, and also provides accurate accounting data, including accurate totals of payout and game win percentage. Advantageously, the currency acceptance method described herein can be easily adapted for use on traditional gaming machines, as well as the more advanced gaming machines available today.

In various additional examples, a gaming machine currency acceptance, monitoring, and accounting system includes a bill acceptor/validator for accepting a plurality of different paper currencies and a plurality of meters for tracking important game quantities as well as an event processor for sensing the state of the gaming machine and updating the meters accordingly. In a non-limiting example, these meters include several accumulative, non-resettable "drop" meters, one for each of the different forms of monetary value acceptable by the gaming machine, including paper currencies of different types, for tracking the total amount of that form of monetary value accepted and, where applicable, returned by the machine in the form of a payout. In addition, accumulative game activity meters can be incorporated to track wagers placed and payouts made, respectively, by each of the one or more games within the gaming machine.

The gaming machine system, by way of non-limiting example, may include individual credit meters for maintaining both the total game credit purchased by a player in response to inserting paper currency and the amount of that game credit that has not yet been risked and thus has not yet become part of game activity. The accounting system correctly updates the game activity meters and can be used with any type of gaming machine including traditional coin only games as well as more advanced gaming machines available today.

In accordance with an example, a primary currency, such as U.S. dollars, is processed normally by a bill validator, and the game credit meters are incremented based on the denomination(s) of the primary currency. Additionally, a secondary currency, such as Canadian dollars or British pound notes, by way of non-limiting examples, may be inserted into the bill validator. The bill validator also recognizes the secondary currency and converts the monetary value into a code such as a bar code having a unique prefix and a special known code to match the denomination of the inserted currency.

In an example embodiment, a bill validator sends the bar code directly to the game to be played, which passes it to a game monitor unit which in turn sends the code to an electronic slot management system host computer. The electronic slot management system host computer has one or more stored currency conversion rates entered by the gaming establishment and employed to convert the monetary value of the secondary currency to an equivalent value in terms of the primary currency. The electronic slot management system host computer then sends the amount as electronic funds to the game monitor unit which sends the information to the game to post a credit to the game and to increment the game credit meters. In accordance with an example, prior to posting the credit, the gaming machine prompts the player to accept or reject the exchange rate and amount of credit.

In accordance with an example aspect, an event processor can properly maintain the state of a gaming machine that has been originally equipped or retrofitted with a bill validator or other currency accepting device that accepts a plurality of types of paper currency. The amount of the game credit purchase is preferably reflected on both a game credit meter and a residual credit meter to indicate that the credit just purchased has not yet been risked. If the player subsequently cashes out, the event processor will not add the amount of this residual credit to the game activity meter. Therefore, calculations based on game activity such as payout and win percentage will reflect only the actual wagering activity at the gaming machine.

In accordance with yet another example aspect, the accounting system can be used with video lottery systems which accept different types of paper currencies and may include many games within a single cabinet. Advantageously, in certain embodiments, the accounting system may maintain data for all of the games using only a single set of accounting meters. The system associates the current meter values with a particular game through an indicator that uniquely identifies the game currently in use. When a player selects a new game in the video lottery system, a change of game event is generated, and in response the system updates the game identifier. When a change of game event occurs, the current meter data can be added to the accumulated accounting data for the previous game. Consequently, the accounting system can maintain records of accounting data for each game in the machine.

The foregoing and other features and advantages will become more readily apparent from the following detailed description of various examples, which proceeds with reference to the accompanying drawing.

BRIEF DESCRIPTION OF THE DRAWING

Various examples of embodiments and/or aspects thereof will be described in conjunction with the accompanying figures of the drawing to facilitate an understanding. In the figures, like reference numerals refer to like elements. In the drawing.

DETAILED DESCRIPTION

In non-limiting example embodiments, systems and methods as described herein enable use of various paper currencies in a gaming machine system. An example gaming machine system 8 is shown in FIG. 1.

Figure 1:
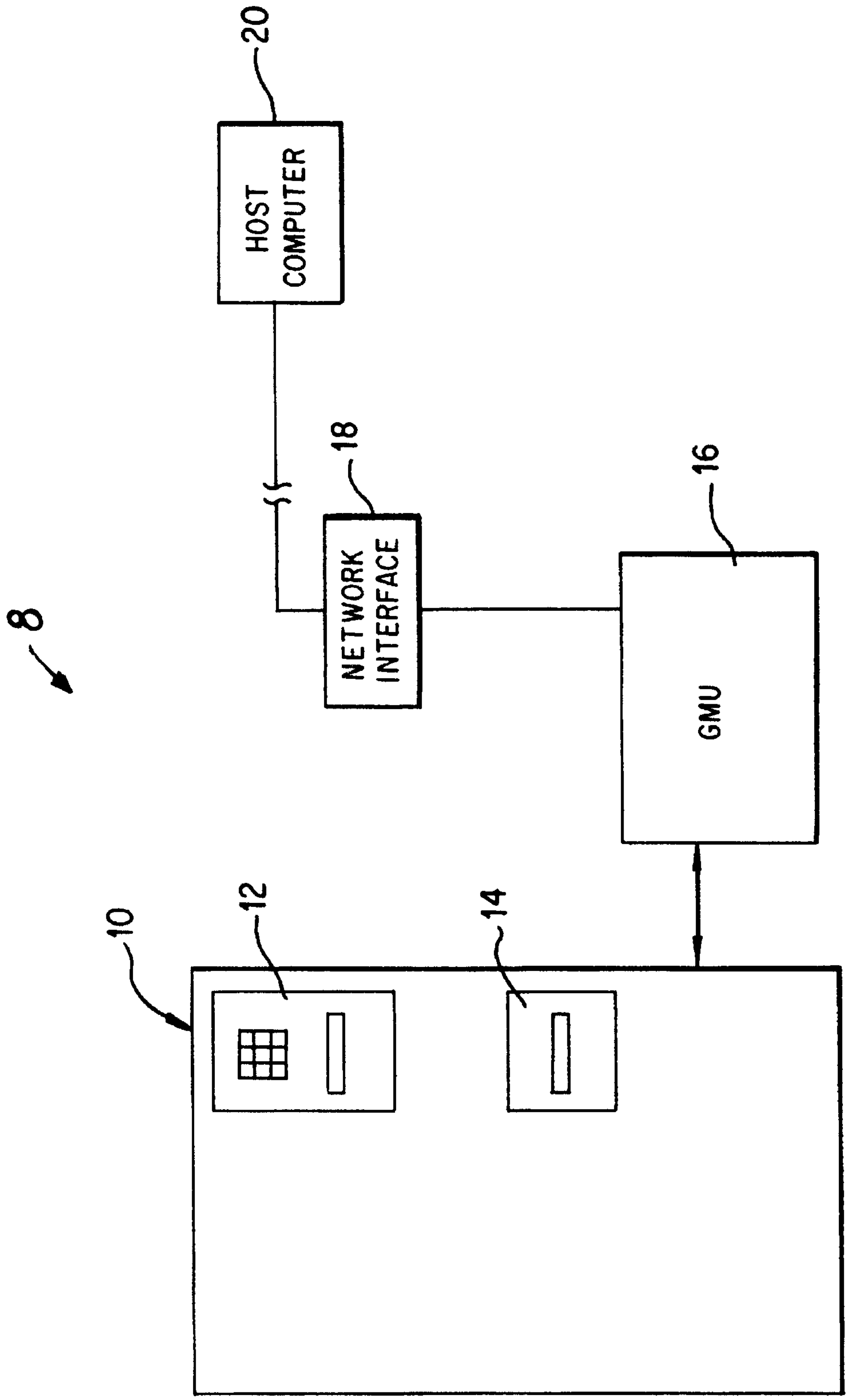
FIG. 1 is a schematic block diagram showing hardware elements of an example system.

In FIG. 1, block 10 represents a gaming machine which includes a structure for accepting paper currency or the equivalent from a player and for paying out cash or other items of monetary value. The example system of FIG. 1 can be used with a variety of different types of gaming machines such as slot machines, video poker games, and video lottery systems that is configured to accept various denominations of different types of paper currencies. Accordingly, gaming machine 10 can be equipped with a note or bill acceptor/validator (BV) 14 capable of accepting paper money or notes in various denominations issued by various jurisdictions. In addition, BV 14 can be configured to accept bar coded coupons or "Fast Cash" vouchers. The gaming machine 10 can also be configured to accept coins and items of monetary value in forms other than cash and bar coded coupons or "Fast Cash" vouchers. For example, gaming machine 10 can be equipped with a multiple card reader and key pad 12 for accepting wagering using credit cards, smart cards, or other data cards related to player credit accounts.

As shown in FIG. 1, other components of example gaming machine system 8 include a game monitor unit (GMU) 16, a computer network interface 18, and an electronic slot management system (e.g. an SDS™) central or host computer 20. The GMU 16 collects data from gaming machine 10 and performs game monitoring and other accounting and security functions. The GMU 16 transmits accounting data along with information about the current state of gaming machine 10 to SDS host computer 20 via the network interface 18. The example SDS host computer 20 may be, by way of non-limiting examples, a computer motherboard, a personal computer, a computer workstation, a minicomputer, a mainframe computer, etc. depending on the size of the installation and the number of gaming machines. Alternatively, by way of further non-limiting examples, a SDS host computer may be a web server or a virtual machine "in the cloud," e.g. implemented by cloud computing services such as those provided by Amazon, Inc. and others. The SDS host computer 20 may also consist of a network of similar computers linked together and other computing platforms. The SDS host computer 20 archives accounting data and customer data in a database, calculates other values, and takes actions based on this accounting data and performs security functions based on exceptional events. A more detailed description of a gaming machine system in conformance with FIG. 1 is provided in U.S. Pat. No. 5,429,361, the disclosure of which is hereby incorporated by reference into the present application.

In accordance with another aspect, a monitoring and accounting system and method are provided for use with gaming machine 10. In one example, accounting functions are carried out by GMU 16, which can be a single or multiple circuit board computer which has a microprocessor or microcontroller, by way of non-limiting examples. Alternatively, gaming machine accounting functions may be performed by a hardware or firmware subsystem within gaming machine 10 itself. The GMU 16 can be located within gaming machine 10 or remotely, communicating with gaming machine 10 in that case by a communication cable. In addition to performing game accounting, GMU 16 can record transactions and perform maintenance and security functions in connection with gaming machine use.

Figure 2:
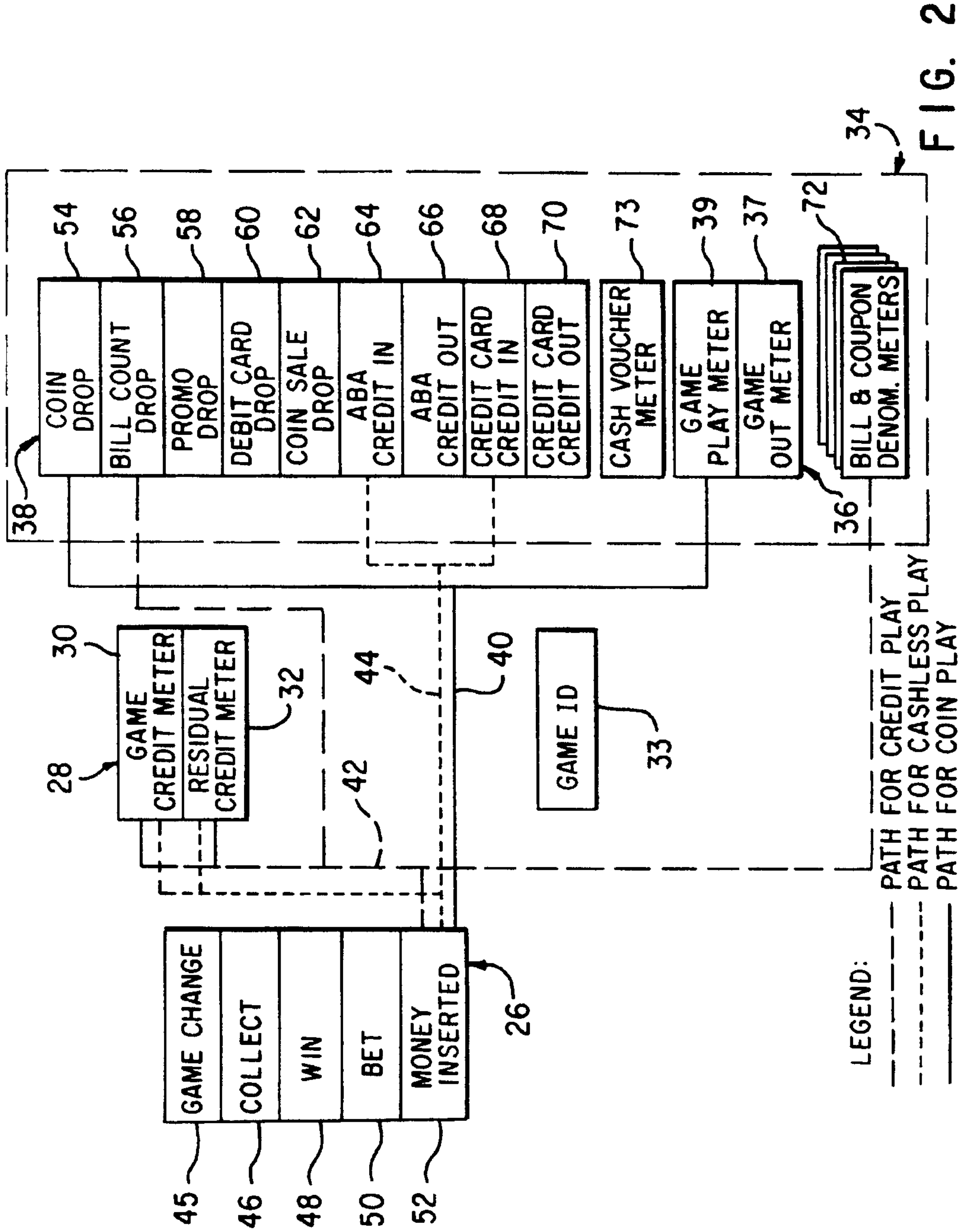
FIG. 2 is a schematic block diagram of example accounting system components.

FIG. 2 shows a schematic block diagram of an example of a generalized game monitoring and accounting system. The game accounting system may comprise, by way of non limiting examples a plurality of accounting meters 34, which includes a set of drop meters 38 and game activity meters 36, for tracing all monetary flows and game activity, respectively, for the particular gaming machine. The accounting meters 34 are preferably non-resettable, accumulative meters and thus they establish an audit trail for the various quantities they track, and may be real or virtual. In addition, credit meters 28 monitor game credit and provide separate meters for the total game credit available to a player and the amount of that credit that has not yet been risked. The game accounting system also includes a game event processor 26 which responds to a variety of gaming machine events and updates the accounting meters accordingly. The event processor 26 is preferably compatible with a variety of gaming machines, including traditional coin-only machines as well as the more advanced automated cashless versions.

The accounting meters 34 provide a complete record of all gaming activity at the gaming machine. Monetary flows are tracked by a plurality of drop meters 38, one drop meter 38 for each of the different forms of monetary value accepted by the gaming machine. The coin drop meter 54 is known by persons skilled in the art and represents the total value of coins that have been diverted to a "drop bucket" in the gaming machine cabinet and thus can be collected by the gaming establishment. A number of additional "drop" meters are provided that represent monetary value that is collected by the gaming establishment in different forms. In accordance with a non-limiting example, the drop meters include a bill count drop meter 56 which counts all paper currency that has been inserted into the BV 14.

The accounting meters 34 may also include meters for tracking other monetary flows. For example, the bill and coupon denomination meters 72 provide a count of the number of bills of various denominations and the total number and value of bar coded coupons or "Fast Cash" vouchers that have been received by the gaming machine. For tracking an alternative form of monetary outflow, a cash voucher meter 73 counts the total value of all printed vouchers that have been issued by the machine.

Considered in more detail, in accordance with an example, a primary currency, such as U.S. dollars, is processed normally by the BV 14. Additionally, a secondary currency, for example, Canadian dollars, may alternatively be inserted into BV 14. The BV 14 recognizes the secondary currency (e.g., Canadian $20). In one example, BV 14 converts the monetary value of the inserted currency into a bar code having a unique prefix, preferably other than "7," and a special known code to match the denomination. The BV 14 sends the bar code directly to the selected game being played on the gaming machine 10, which passes the code to GMU 16 which in turn sends the code to SDS host computer 20. To implement the example, BV 14 is modified to recognize and validate the secondary currency(ies), and the bill count drop and denomination meters 56 and 72, respectively, are also modified to accommodate accounting for the one or more secondary currencies.

Note that in the above scenario, the game, GMU 16, and SDS host computer 20 all preferably process the bar code as electronic funds similar to a "ticket redemption," so there is no fundamental change in their processes and no second connection from the BV 14 to the GMU 16. Accordingly, only minor changes are needed to soft count software or firmware run by the GMU 16 and SDS host computer 20.

In accordance with one example, if the system accepts more than one type of currency, drop meters are enabled only for multiple currency electronic funds credits and are not enabled for any other form of electronic funds transfers. Alternatively, in accordance with another example, as shown in FIG. 2, the drop meters 38 may include a promo drop meter 58, which counts all promotional credits that are received by the gaming machine from any source (including, e.g., credits from coupons or cards issued by the gaming establishment or from "bonus points" generated by the machine itself); a debit card drop meter 60, which counts all credits from debit memory cards (i.e., cards which cannot receive additional credit from the gaming machine); and a coin sale drop meter 62, which counts all credits received from a "change person's" memory card which is inserted into the gaming machine to provide coins for a player in exchange for paper currency. Credit card transactions for cashless game play may be tracked in an ABA credit-in meter 64, ABA credit-out meter 66, credit card credit-in meter 68, and credit card credit-out meter 70. The difference between the credit-in and credit-out meters is equivalent to a credit card drop meter. The details of accounting for such wagering using these monetary instruments are described in U.S. Pat. No. 5,470,079, the disclosure of which is hereby incorporated by reference into the present application.

Wagering activity is tracked by a set of game activity meters 36, comprising a game play meter 39 and a game out meter 37, for tracking the total number of bets and wins, respectively, for the gaming machine 10. These meters represent only the actual wagering activity at the machine and exclude any activity due to, for example, purchased credits that are converted to cash without being wagered.

In addition to the accounting meters 34, a number of nonaccumulative, resettable meters may direct the operation of the accounting system. For example, the accounting system may maintain a game ID indicator 33 which contains a unique identifier for the game currently in use on a multi-game video lottery system. Moreover, credit meters 28 include a game credit meter 30, which reflects the total amount of credit available to the player at any time, and a residual credit meter 32, which reflects the amount of credit purchased by a player that has not yet been risked and, therefore, is not yet part of game play. This separation of credits purchased and credits risked enables the system to compensate for "vended credits" in the accounting model.

In operation, accounting meter changes are driven by player activity signified by gaming machine "events." The GMU 16 receives notification that game events have occurred via event processor 26. Possible events include: coin or other money input by a player 52, wagers placed by the player 50, game wins issued to the player 48, a "collect" event 46 prompted by the player signifying the player's desire to withdraw available game credit from the gaming machine, and a game change event 45 signifying that a player has requested a change of game at a video lottery machine.

In addition, the accounting system ensures accounting data integrity by associating meter data with gaming machine events. Specifically, the system updates the accounting meters simultaneously with the gaming machine events that resulted in a change of meter state so that there is no latency between events and data. Therefore, the system can correlate changes in important quantities such as payout and game win percentage to events which caused the change. Furthermore, when the system transmits data to other components within the system, it preferably transmits both accounting and event data in a single message. Therefore, the host computer system can log the data to a database while maintaining the proper relationship between the data and the corresponding state of the gaming machine.

Thus, the accounting system preserves data integrity by maintaining a close relationship between gaming machine events and the meter values to which the events pertain. Whenever the system updates meter values, the event which caused the changes is also recorded. Moreover, whenever accounting data is transmitted, for example, when GMU 16 sends meter values to SDS host computer 20, an indicator of the event that generated the latest change in the data accompanies the meter values. Thus, the host can record the data in proper temporal relationship to the pertinent game events.

The event processor 26 records the events on the game credit meters 28 and accounting meters 34 as indicated by the type of event and the game play mode. For example, a player money insertion event 52 will affect the game credit meters 28 and the accounting drop meters 38 in one way for coin game play (path 40) and in another way for credit game play including insertion by a player of various paper currencies (path 42) and still another way for cashless game play (path 44). Moreover, a game change event 45 precipitates a different chain of events for handling multi-game gaming machines such as video lottery systems. The operation of the accounting system in the mode for money inserted in the form of one or more paper currencies in accordance with an example is discussed in detail below.

The gaming machine 10 is capable of accepting paper currencies issued by different jurisdictions as well as items having monetary value in forms other than cash. For example, gaming machine 10 can be equipped with the BV 14 for accepting paper currency as described above in conjunction with FIG. 1. In this form of wagering, a player has the option of collecting the amount of credit purchased without placing any amount at risk and, therefore, the amount purchased cannot be reflected immediately in the game play meter 39. Accordingly, the accounting system segregates credit purchased using various paper currencies but not risked from other credit available, such as that available from game winnings.

As noted previously, the accounting system of FIG. 2 can be implemented by a variety of systems and components. For example, some or all of the processes associated with the accounting system may be computer implemented processes or can be implemented in other forms of electronic, electromechanical, etc. technologies and vice versa. Accordingly, it will be appreciated that certain processes described herein may be implemented in multiple technologies including, but not limited to digital, analog, electromechanical and mechanical technologies.

Figure 3A:
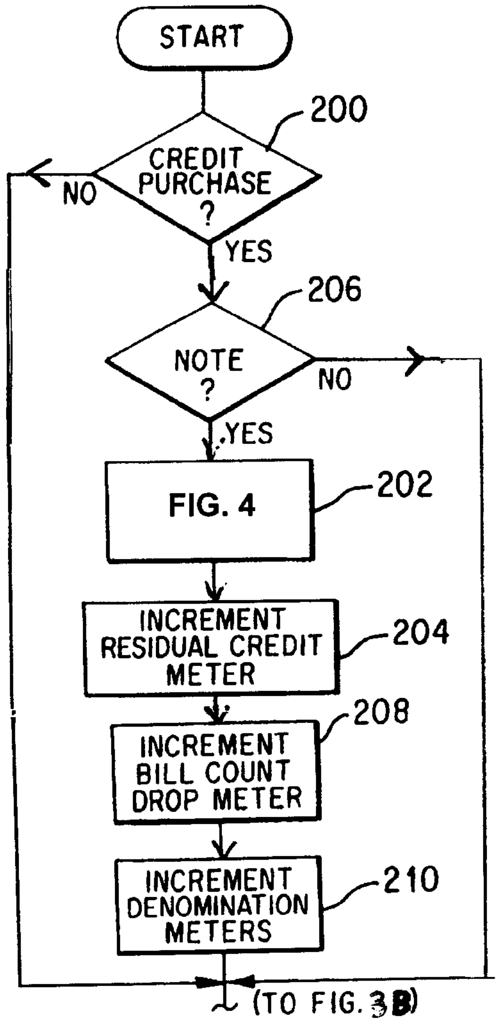
FIGS. 3A and 3B comprise a flowchart illustrating operation of an example accounting system during credit game play.
Figure 3B:
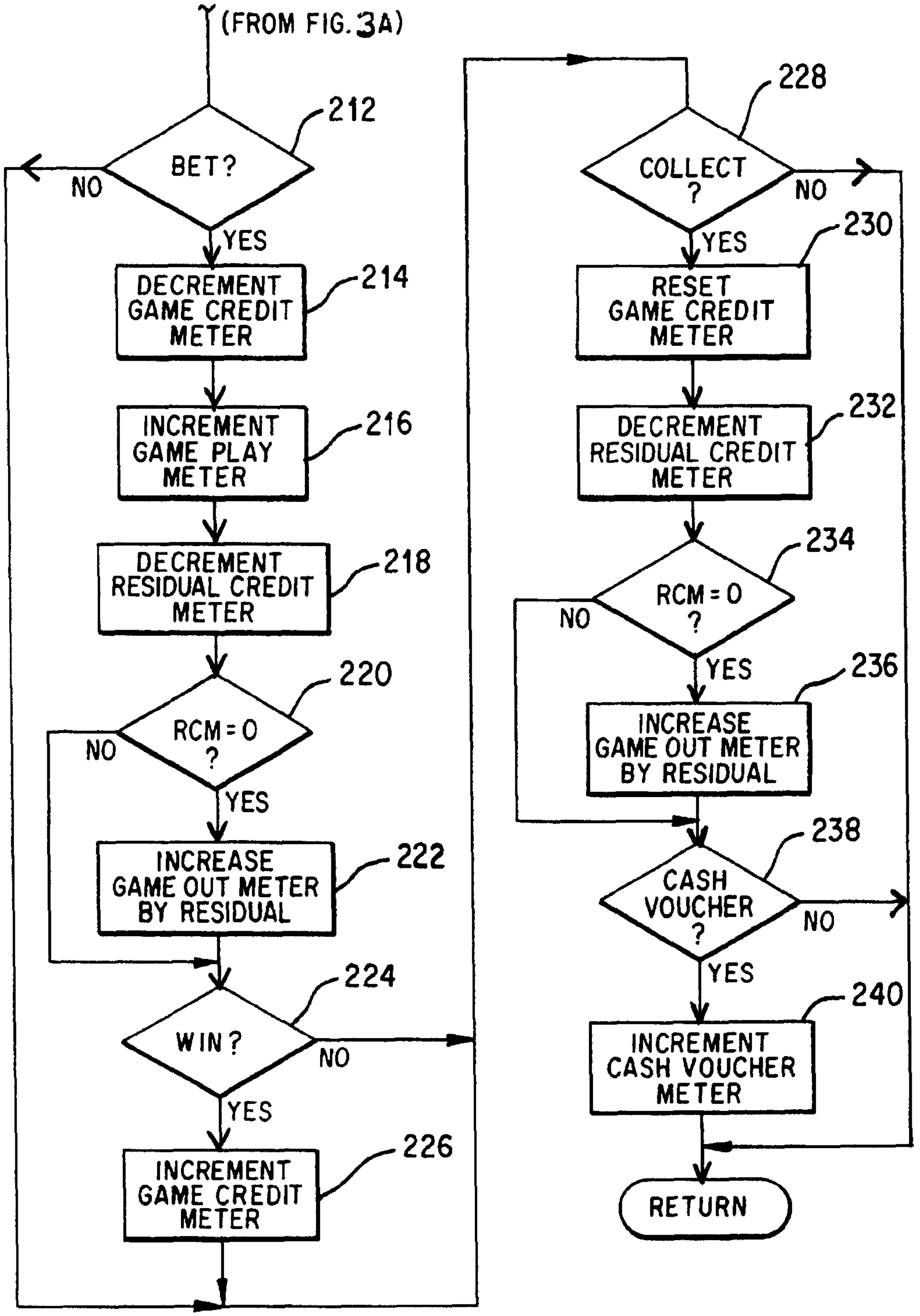

FIGS. 3A and 3B comprise a flowchart showing operation of the accounting system during credit game play based on credit posted in response to insertion by a player of paper currency 52 into the gaming machine. At decision step 200, the system determines if items of monetary value have been inserted by the player. At decision step 206, the accounting system discerns whether or not monetary value in the form of paper currency has been inserted by the player. Once this has occurred, the system increments the game credit meter 30 (at step 202) to reflect the newly purchased game credit and also increments the residual credit meter 32 (at step 204) indicating that the credit purchased is not yet part of game play. The system also increments the bill count drop meter 56 (at step 208). When paper currency has inserted by the player, the accounting system also preferably records the denomination(s) of the bill(s) in the bill denomination meters 72 (at step 210). When a soft count occurs, both primary and secondary currency data are processed and sent to SDS host computer 20.

Figure 4:
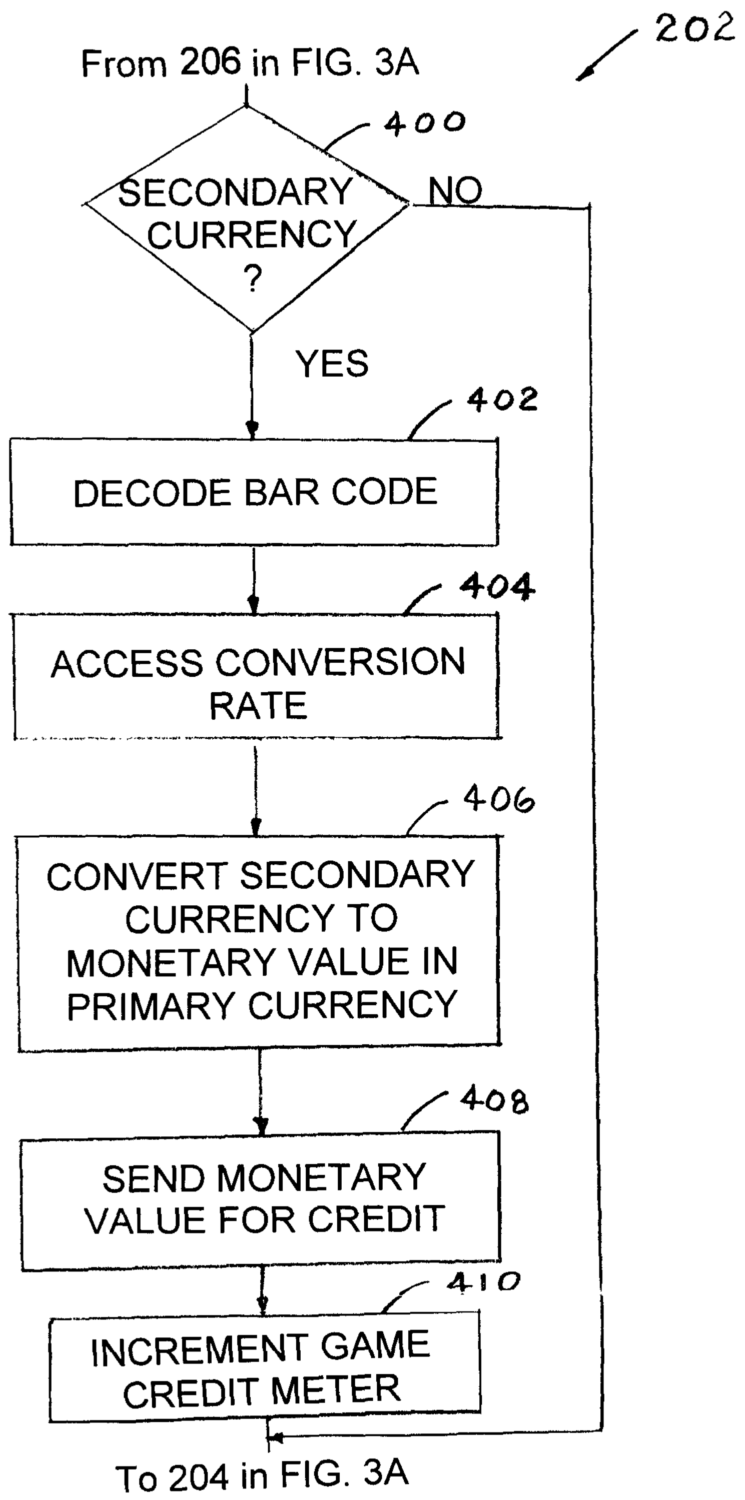
FIG. 4 is a flowchart illustrating an example operation of the accounting system accommodating acceptance of various paper currencies.

FIG. 4 illustrates the method represented by step 202 shown in FIG. 3A for processing one or more paper currencies in accordance with one example. The GMU 16 determines whether the currency is a secondary currency at decision step 400. If so, GMU 16 sends a bar code for the secondary currency to SDS host computer 20 which receives the bar code and decodes the bar code to determine the type of the secondary currency at step 402. In step 404, SDS host computer 20 accesses a memory location(s) or database, in which one or more current currency conversion rate(s) entered by the gaming establishment are stored in the system.

The SDS host computer 20 uses the conversion rate for the secondary currency inserted into the BV 14 to convert the monetary value of the secondary currency to the corresponding monetary value in the primary currency at step 406. For example, the conversion rate for converting Canadian dollars to U.S. dollars may be 0.856 such that Canadian $20 is converted to U.S. $17.168.

The SDS host computer 20 then sends the amount of the conversion as electronic funds to the GMU 16 at step 408. The GMU 16 in turn sends the data to the game, which posts credits to the game credit meter 30 at step 410 and increments the residual credit meter 32 at step 204 as a "ticket-in" credit transaction as shown in FIG. 3. In accordance with one example, prior to posting the credit, the gaming machine 10 prompts the player to accept or reject the exchange rate and amount of credit. If the exchange rate and amount of credit are rejected, the BV 14 ejects the bill or note. If the exchange rate and amount of credit are accepted, the system electronically transfers the converted funds as a credit to the gaming machine 10.

The SDS host computer 20 also records transaction data including the conversion value and denomination(s) of the secondary currency. The SDS host computer 20 is thus extended to expand the soft count reporting to account for a player using the secondary currency. SDS host computer 20 accounting may also be modified to provide special reports which show all currency conversions, and reconciliation involving a combination of regular and currency ticket redemption data to the game meters 28 for ticket-in credit. Other drop and accounting reports are updated by the SDS host computer 20 as applicable.

The accounting system does not assume that the winnings issued by the gaming machine will be available as an input to the system. Rather, the accounting system calculates game winnings by tracking the amount of residual credit purchased by the player using paper currency. The amount of game credit in excess of the balance in the residual credit meter 32 represents the total amount of winnings issued by the gaming machine 10 at that time. Therefore, when the player either wagers or collects available game credit, the portion of the wager or the amount collected above the balance in the residual credit meter 32 represents previous game winnings. Accordingly, the game out meter 37 will be increased by this amount.

Referring to FIG. 3B, when the player places a wager (as determined by decision step 212), the game play meter 39 is incremented at step 216, and the game credit meter 30 is decremented by the amount of the wager at step 214, signifying that a portion of the credit available to the player has now been risked. At step 218, the amount of each wager is subtracted from the residual credit meter 32 until the balance in the residual credit meter is reduced to zero. After each subtraction, at decision step 220 the balance in the residual credit meter 32 is checked to determine whether the balance has been reduced to zero. If the residual credit meter 32 has not reached zero, the game out meter 37 will not increase. However, if the residual credit meter 32 has been reduced to zero by subtracting the amount of the wager, the amount of the wager in excess of the balance in the residual credit meter 32 before subtraction represents prior game winnings. Therefore, the game out meter 37 is incremented by the excess at step 222. Thereafter (if no additional game credit is purchased by the player, for example, using paper currency), all further wagering from the available credit will be out of actual winnings and thus the game out meter 37 will be increased accordingly. If the wager results in further winnings (as determined by decision step 224), the win increases the total game credit available to the player as reflected in the game credit meter 30 (at step 226).

At decision step 228, the accounting system determines whether the player has requested a payout of available game credit signified by a collect event 46. If so, the system decreases the residual credit meter 32 by the balance in the game credit meter 30 until the residual credit meter is reduced to zero (at step 232), as described above, and the game credit meter 30 is reset (at step 230). If the residual credit meter 32 is zero after subtraction (as determined by decision step 234), the amount collected in excess of the balance in the residual credit meter 32 before subtraction reflects the amount of prior wins issued by the gaming machine 10. Therefore, the game out meter 37 is increased by the excess amount at step 236.

The mode of gaming machine payout is determined at decision step 238. If the machine pays out in the form of a printed voucher, the system increments the cash voucher meter 73 by the amount collected by the player (i.e., the balance in the game credit meter 30 before it was reset) at step 240. Alternatively, when the gaming machine 10 includes a coin payout hopper, the gaming machine may pay out this sum from the coin payout hopper, and the accounting system need not take any action. The system then resets and awaits further game activity from the player.

The accounting system can accurately determine the state of all known kinds of gaming machines including traditional coin only games that have been retrofitted to accept various different paper currencies. In this case, by separating the amount of game credit purchased that has not yet been risked in the manner described above, the accounting system can provide accurate calculations of game percentage and changes in coin hopper level without the necessity of metering winnings and coin discharge, which is unavailable on some gaming machines.

Game win percentage is given by the following expression:

$$\text{Game Win Percentage}=\text{Total Winnings Paid Out}/\text{Total Game Play}$$

where Total Winnings Paid Out is, in this example, stored in the Game Out Meter 37, and Total Game Play is stored in the Game Play Meter 39.

Similarly, in the case of coin gaming machines, the change in coin hopper level over time is given by the following expression:

$$\text{Change in Hopper Level}=\text{Total Game Play}-\text{Total Payouts}-\Sigma\text{ All Drop Meters}$$

where Total Game Play is stored, in this example, in the Game Play Meter 39, and Total Payouts is stored in the Game Out Meter 37.

Although, for convenience, the operation of the accounting system is described as a sequential process, it will be appreciated that processing game events can be implemented as an asynchronous process, where the accounting system is capable of handling any event as it occurs, independently of preceding events.

The accounting system also supports accounting of multiple games within a single gaming machine, which is common in video lottery systems. Multiple game accounting is accomplished using only one set of accounting meters for each multi-game machine. First, referring to FIG. 2, the accounting system maintains a game ID register 33, which stores a unique identifier representing the current game in play. Second, when a player selects a different game, a game change event 45 is generated. In response to the game change event 45, event processor 26 updates the game ID register 33 and invokes a context switch which enables the accounting system to track game activity on a per game basis. The accounting system may also check periodically the current ID of the game being played at the gaming machine 10. This provides a recovery mechanism in the event that a game change event is lost. As a result, the system can generate a game change event 45 if the game ID in register 33 does not match the game ID of the current game in play.

In one example, GMU 16 reports events along with accounting data at the time of the event to SDS host computer 20. As described above, the accounting system ensures that accounting data is synchronized with gaming machine events such that meter data accurately reflects the state of gaming machine 10. When a game change event 45 occurs, GMU 16 transmits a game change message to SDS host computer 20. The meter data that accompanies that message represents the last meter values for the previous game. Therefore, the difference in meter values between successive game change messages represents all the activity that occurred while the previous game was played. This allows SDS host computer 20 to maintain accumulations of meter data for each game available on the multi-game machine.

Figure 5:
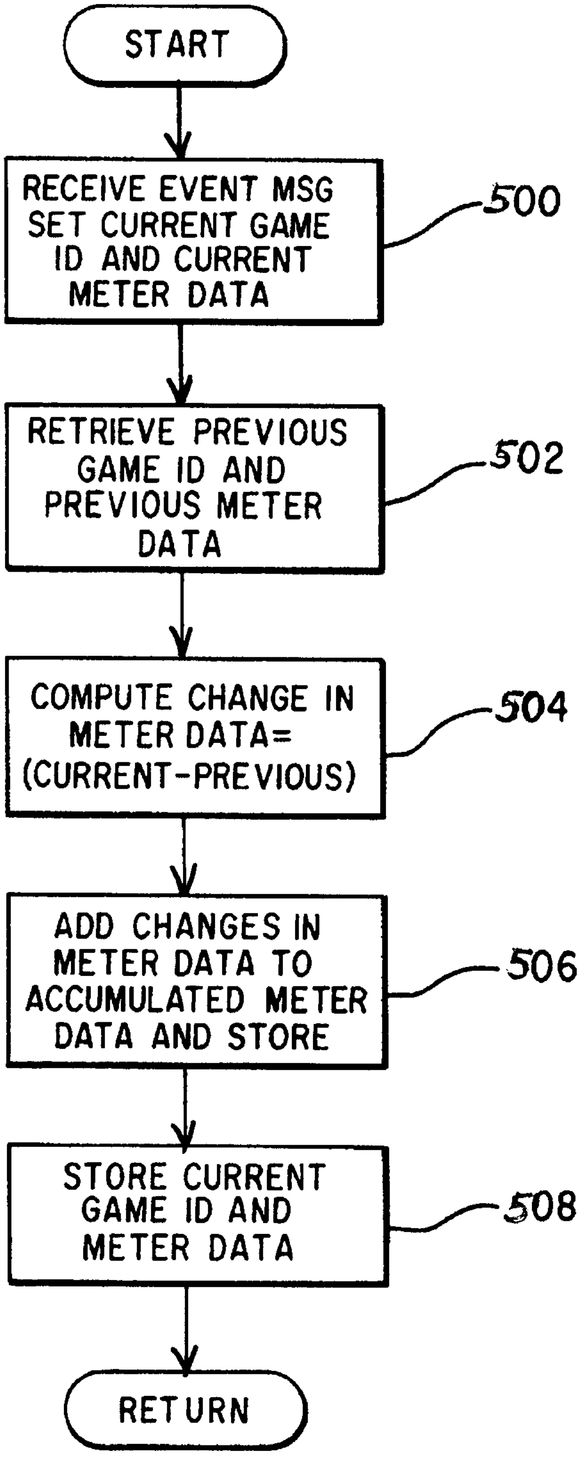
FIG. 5 is a flowchart illustrating operation of the accounting system when a game change event has occurred.

FIG. 5 is a flowchart illustrating example actions which can be taken on the occurrence of a game change event 45. At step 500, SDS host computer 20 receives the game change message and extracts from the message the current game ID and the meter values at the time of the event. At step 502, the SDS host computer 20 recalls the previous values of game ID and meter data from memory. The change in meter values since the last game change is computed at step 504. The SDS host computer 20 then adds these changes to the accumulated meter values for the previous game that the host has stored in its memory at a location corresponding to the previous game ID (at step 506). Finally, at step 508, the context switch is completed when SDS host computer 20 stores the current game ID and current meter values in memory, writing over the previous values stored there.

It will be appreciated that a variety of hardware configurations are capable of performing the actions described above. Although the actions taken have been described in reference to the example illustrated in FIG. 1, many other hardware configurations are possible. For example, the actions of GMU 16 and SDS host computer 20 may alternatively be performed by a subsystem within the gaming machine itself. Also, as noted previously, various components that have be described in examples as, for example, being software implemented can be, for example, firmware, state machine, electromechanically or otherwise implemented.

Non-limiting examples have been described for the purpose of illustrating the manner in which various systems and methods may be used. It should be understood that implementation of other examples and variations and modifications thereof will be apparent to persons skilled in the art, is not limited to the specific examples described. It is therefore contemplated to cover any and all examples, modifications, variations, and equivalents that fall within the true scope and spirit of the basic underlying principles disclosed herein.

What is claimed is:

1. A system for a gaming machine including a video display, one or more input devices and a hardware or firmware subsystem configured to accept game credit purchases and wagers from a player using one or more types of currencies comprising:

a bill or note validator comprising said gaming machine to receive and recognize a primary currency and a secondary currency, each issued by a different jurisdiction and related by an exchange rate, if inserted by a player into said gaming machine, said bill or note validator encoding a monetary denomination of said secondary currency into electronic bar code data having a unique prefix and a special known code to match said monetary denomination of said secondary currency if said secondary currency is recognized by said bill or note validator;

an electronic slot management system host computer including a stored currency conversion rate coupled to said gaming machine for electronically receiving said encoded monetary denomination bar code data of said secondary currency to decode said encoded monetary denomination and to convert a monetary value of the secondary currency to an equivalent amount of electronic funds in the primary currency using the stored currency conversion rate; and a game credit meter comprising said gaming machine to store a total amount of game credit purchased by the player of said gaming machine including game credit purchased by the player in response to the player inserting one or more bills or notes of either or both of the primary currency and the secondary currency into said gaming machine via the bill or note validator;

wherein a collect event prompted by the player initiates a withdrawal of the game credit stored by the credit meter.

2. A system as recited in claim 1 further comprising:

a game monitor unit coupled to said gaming machine and said host computer, said game monitor unit to send said bar code data corresponding to the monetary denomination of the secondary currency to said host computer;

wherein said host computer sends said equivalent amount of electronic funds to said gaming machine via said game monitor unit; and wherein said gaming machine increments the total amount of game credit stored in said game credit meter by the equivalent amount of electronic funds.

3. A system as recited in claim 1 further comprising:

a game monitor unit coupled to said gaming machine and said host computer, said game monitor unit to send said bar code data corresponding to the monetary denomination of the secondary currency to said host computer;

wherein said host computer sends said conversion rate and equivalent amount of electronic funds to said gaming machine via said game monitor unit;

a gaming machine interface comprising said gaming machine to prompt the player to accept or reject the conversion rate and equivalent amount of electronic funds;

wherein the total amount of game credit stored in said game credit meter is incremented by the equivalent amount of electronic funds if the player accepts; and wherein the secondary currency is ejected by the gaming machine if the player rejects.

4. A system as recited in claim 1 wherein said gaming machine further comprises a residual credit meter to store an amount of residual game credit corresponding to available credit purchased by a player who inserts one or more bills or notes of either or both of the at least primary currency and the secondary currency into said gaming machine.

5. A system as recited in claim 1 wherein said gaming machine further comprises a currency drop meter for tracing the amount of currency accepted by said gaming machine.

6. A system as recited in claim 1 wherein said gaming machine further comprises bill denomination meters for tracing the total amount of each denomination of bill or note accepted by said gaming machine.

7. A system as recited in claim 4 further comprising an event processor to sense gaming machine events including the amount and form of game credit purchase corresponding to credit purchased by a player who inserts one or more bills or notes of either or both of the at least primary currency and the secondary currency into said gaming machine and the amount of a wager by the player and to update said residual credit meter when game credit is purchased, when a wager is placed, and when credit is collected by the player, and to increment a game activity meter comprising said gaming machine by the amount of credit collected in excess of the amount of residual credit available to the player.

8. A method for a gaming machine including a video display device, one or more input devices and a hardware or firmware subsystem that accepts at least two types of currencies for engaging in wagering by a player comprising:

enabling at least a primary currency and a secondary currency, each issued by a different jurisdiction, to be inserted into the gaming machine;

recognizing one or more bills or notes of either or both of the at least primary currency and the secondary currency inserted into the gaming machine;

encoding a monetary denomination of the second currency into electronic bar code data having a unique prefix and a special known code to match said monetary denomination of said secondary currency in response to a player inserting one or more bills or notes of the secondary currency into said gaming machine if said secondary currency is recognized;

decoding the encoded monetary denomination of the secondary currency;

converting the decoded monetary denomination of the secondary currency to an equivalent amount of electronic funds in the primary currency using a stored currency conversion rate;

determining an amount of game credit to be credited to the player based upon the equivalent amount of electronic funds in the primary currency; and storing an amount of total game credit purchased by the player of said gaming machine including game credit purchased by the player in response to the player inserting one or more bills or notes of either or both of the primary currency and the secondary currency into said gaming machine; and upon receiving a collect event prompted by the player, initiating a withdrawal of the game credit stored by the credit meter.

9. A method as recited in claim 8 further comprising:

prompting the player to accept or reject the conversion rate and amount of electronic funds;

adding the equivalent amount of electronic funds to the amount of total game credit purchased if the player accepts; and ejecting the secondary currency if the player rejects.

10. A method as recited in claim 8 further comprising tracing the amount of currency accepted by the gaming machine.

11. A method as recited in claim 8 further comprising tracing the total amount of each denomination of bill or note accepted by the gaming machine.

* * * * *